Patented Jan. 9, 1951

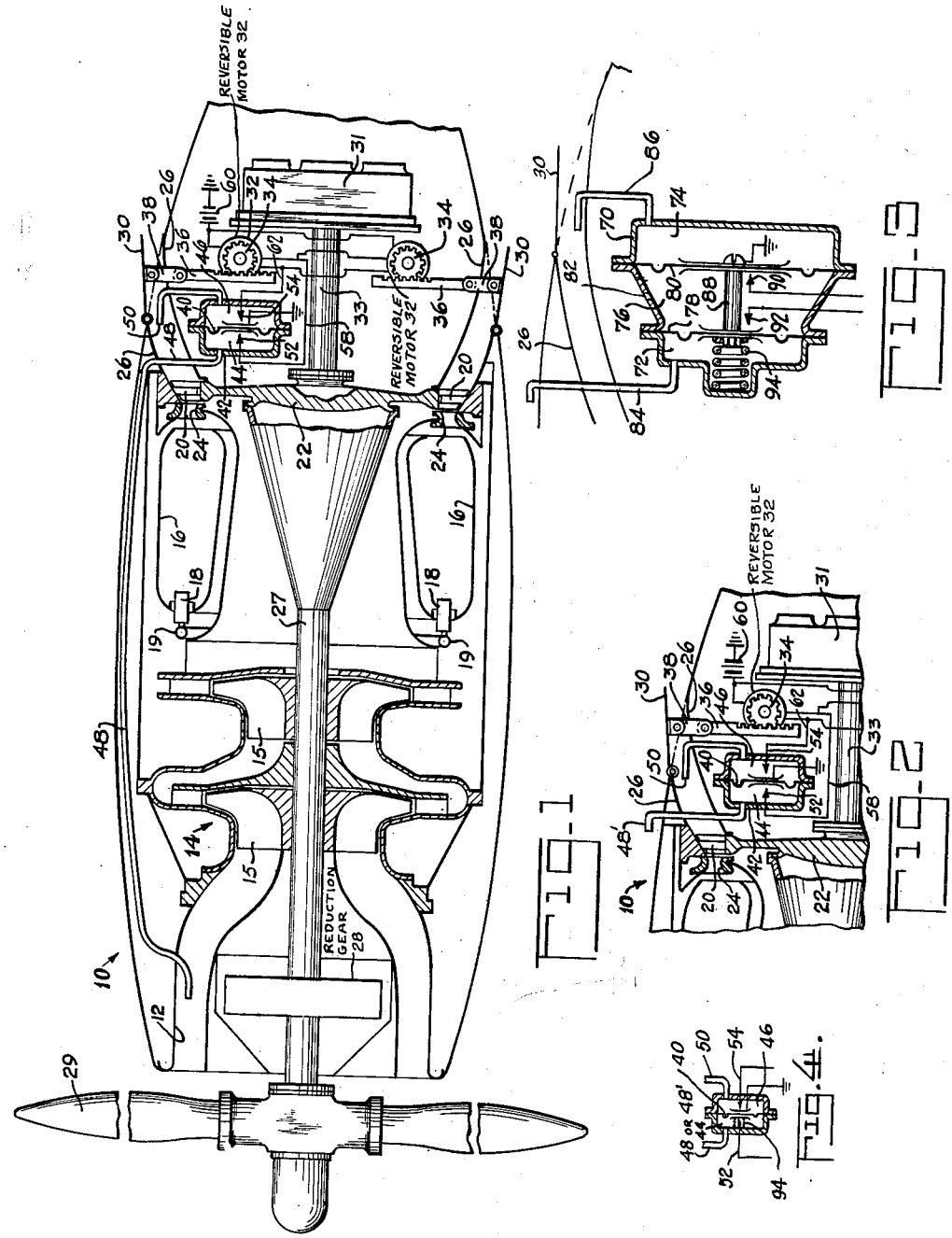

2,537,772

UNITED STATES PATENT OFFICE 2,537,772

TURBO-PROP EXHAUST NOZZLE CONTROL SYSTEM UTILIZING IMPACT AND EXHAUST PRESSURES AS PARAMETERS

Wilton G. Lundquist, Hohokus, and Kenneth A. Browne, Ridgewood, N. J., assignors to Wright Aeronautical Corporation, a corporation of New York Application November 30, 1944, Serial No. 565,980

9 Claims. (Cl. 60—35.6)

This invention relates to an internal combustion engine installation for a vehicle in which the vehicle driving thrust is derived not only from the power output of the engine but also from the jet propulsive thrust of the engine exhaust. The invention is particularly concerned with a gas turbine power plant installation for aircraft in which the turbine drives an aircraft propeller and the turbine exhaust also provides an aircraft propulsive thrust. Such a power plant is commonly called a "turbo-prop."

In a turbo-prop power plant for aircraft, the jet propulsive effect of the exhaust gases may be effectively used to help the propeller in providing the aircraft with forward thrust. In such an installation the total thrust power per pound of fuel and air is a variable which depends on the jet discharge velocity of the exhaust gases. For a given installation, aircraft speed and altitude, this total thrust power per pound of fuel and air (thrust efficiency) is a maximum at a particular value of the exhaust discharge velocity, and this total thrust power decreases if the exhaust discharge velocity increases or decreases from this particular value. Accordingly, it is an object of this invention to regulate the exhaust nozzle discharge area to adjust the exhaust discharge velocity for maximum thrust efficiency. Actually the exhaust discharge velocity for maximum thrust efficiency varies with the aircraft velocity and with a function which depends on the turbine and propeller efficiencies and on the velocity coefficient of the exhaust nozzle. Therefore it is a further object of this invention to adjust the exhaust nozzle discharge area with variations in the exhaust velocity and velocity of the aircraft.

At this point it should be noted that as herein used, the "impact pressure" of a fluid is equal to the sum of the pressures corresponding to the static and velocity heads of the fluid, that is to the pressure corresponding to the total head of the fluid.

In aircraft having a gas turbine power plant with a forwardly directed air opening, the total head or impact pressure of the entering air will vary with the air speed of the aircraft. However, it is desirable that the volume flow relations of fluid through the turbine power plant be independent of the aircraft speed. This result can be obtained by so controlling the turbine exhaust discharge area to maintain a constant proportion between the total head or impact pressure of the entering air and the total head or impact pressure of the turbine exhaust. That is, if the exhaust nozzle discharge area is adjusted to maintain constant the ratio of the total head or impact pressure of the exhaust gases to the total head or impact pressure of the entering air, then variations in speed of the aircraft will have substantially no effect on the volume flow relations of fluid through the turbine power plant. Accordingly it is an object of this invention to maintain a linear or proportional relation between the total head or impact pressure of the exhaust gases and the total head or impact pressure of the entering air.

Applicants have also discovered that by maintaining the impact pressure of the surrounding undisturbed air relative to the aircraft equal to the impact pressure of the exhaust gases, that the exhaust gas velocity is substantially equal to its magnitude for maximum thrust efficiency. In the absence of any substantial pressure rise in the intake duct from the aircraft propeller or pressure loss in the intake duct because of the flow therethrough, the total impact pressure of the surrounding undisturbed air relative to the aircraft is substantially equal to the impact pressure of the air in the power plant air intake duct. Accordingly it is an object of this invention to adjust the exhaust nozzle discharge area to maintain the impact pressure of the exhaust gases substantially equal to the impact pressure of the surrounding undisturbed air. In this way, the exhaust velocity is automatically adjusted for maximum thrust efficiency and in addition the volume flow relations of the fluid through the power plant are substantially independent of variations in speed of the aircraft.

With conventional propeller and turbine efficiencies, if the exhaust nozzle discharge area is adjusted to maintain the impact pressure of the exhaust gases substantially equal to the impact pressure of the surrounding undisturbed air relation to the aircraft, the resulting exhaust velocity will be slightly larger than the value for maximum thrust efficiency. If this discrepancy should be appreciable, substantially maximum thrust efficiency may be obtained by maintaining a ratio other than unity between the impact pressure of the exhaust gases and the impact pressure of the surrounding undisturbed air relative to the aircraft. However, an exhaust velocity somewhat larger instead of smaller than the value for maximum thrust is desirable since then the turbine power output is less than the power output at maximum thrust efficiency and therefore the required size of the turbine is correspondingly smaller.

Other objects of this invention will become apparent upon reading the annexed detailed description in connection with the drawing in which:

Figure 1 is a schematic view of a gas turbine propeller driven power plant for aircraft in which the turbine exhaust nozzle discharge area is adjusted by the automatic control of the present invention;

Figure 2 is a modification of Figure 1;

Figure 3 is a view of a modified form of control; and

Figure 4 is a partial view of a further modification.

Referring to Figure 1, a gas turbine power plant 10 for an aircraft comprises a forwardly opening air intake duct 12 for an air compressor unit 14 having a pair of centrifugal impellers 15. The air delivered by the compressor unit 14 enters the combustion chamber 16 to which fuel is supplied by nozzles 18 connected to a fuel manifold 19. The combustion gases from the combustion chamber 16 are properly directed into the turbine blades 20 of the turbine rotor 22 by a turbine nozzle 24, and upon leaving the turbine blades the combustion gases are discharged through the exhaust duct 26. The turbine rotor 22 is drivably connected by a shaft 27 to the compressor unit 14 and thence through suitable reduction gearing 28 to an aircraft propeller 29. The propeller 29 is provided with conventional pitch changing mechanism (not shown) for maintaining the propeller and its driving turbine at a substantially constant pre-set rotative speed. For example, said pitch changing mechanism may be similar to that illustrated in Patent No. 2,449,452 to C. W. Chillson. With this combination the total aircraft thrust is a sum of the propeller thrust derived from the turbine and the jet propulsive thrust of the exhaust gases. As illustrated the turbine is also drivably connected to a drive unit 31 by means of a turbine shaft 33, the unit 31 providing drives for various auxiliary power plant equipment.

The discharge area of the annular exhaust duct 26 and therefore the discharge velocity of the exhaust gases is controlled by suitable exhaust flaps 30. Reversible electric motors 32 for adjusting the exhaust flaps may be connected thereto through gearing 34, rack 36 and a link 38. A single motor 32 may be provided for adjusting all of the flaps or as illustrated a single motor is provided for adjusting each individual flap. Obviously any suitable connection may be provided between the motor or motors 32 and flaps 30.

The electric motor or motors 32 are controlled by a flexible diaphragm 40 which is supported by a housing 42 and extends thereacross to divide the housing into two chambers 44 and 46. The impact pressure of the air entering the intake duct 12 is transmitted to the chamber 44 through a conduit 48 and the impact pressure of the exhaust gases in the exhaust duct 26 is transmitted to the chamber 46 through a conduit 50. In this way the control diaphragm 40 is subjected to the pressure differential between the entering air impact pressure and the exhaust gas impact pressure.

The housing 42 is provided with switch contacts 52 and 54 which are arranged to be engaged by the diaphragm 40 upon deflection of the diaphragm to the left or right respectively thereby completing circuits to the flap motor or motors 32. Thus, when the diaphragm 40 is deflected to the left, for example in response to a decrease in the impact pressure of intake air, the diaphragm engages the switch contact 52 to complete a circuit through the line 58 and source of electric energy 60 to operate the flap motors 32 in a direction to effect an opening adjustment of the flaps 30. Similarly, if the diaphragm 40 is deflected to the right, for example in response to an increase in the impact pressure of the intake air, the diaphragm 40 engages the switch contact 54 to complete a circuit through the source of energy 60 and a line 62 to operate the flap motors for effecting a closing adjustment of the flaps 30.

With this structure, the flap motors are automatically operated in response to changes in the aircraft velocity and the exhaust discharge velocity to maintain the impact pressure of exhaust gases equal to the impact pressure of the entering air. Accordingly the volume flow relations of flow through the gas turbine power plant are then substantially independent of variations in the velocity of the aircraft.

With the above described aircraft power plant, the total aircraft forward thrust is equal to the sum of the propeller thrust and the jet propulsive effect of the exhaust gases. At a constant rotative speed of the turbine, the total aircraft thrust power per pound of fuel and air has a maximum or peak value for a particular discharge velocity of the exhaust gases. The particular exhaust velocity at which this maximum or peak thrust occurs depends not only on the aircraft speed and altitude, but also on the efficiencies of the air compressor and turbine and on the velocity coefficient of the exhaust nozzle. If the impact pressure of the exhaust gases is maintained substantially equal to the impact pressure of the surrounding undisturbed air relative to the aircraft, the exhaust discharge velocity will substantially correspond to the value for maximum thrust efficiency. As illustrated, the intake duct 12 opens forwardly about the root ends of the propeller blades and therefore the impact pressure of the air in the intake duct will be substantially equal to that of the surrounding undisturbed air relative to the aircraft. Accordingly the aforedescribed control of the exhaust flaps 30 by maintaining the impact pressure head of the exhaust gases substantially equal to the impact pressure head of the entering air, not only renders the volume flow relations of the fluid through the turbine power plant independent of the aircraft speed, but also maintains the exhaust discharge velocity at the proper magnitude for maximum thrust efficiency.

Since the total head or impact pressure of the air entering the intake duct is substantially equal to the total head or impact pressure of the surrounding undisturbed air stream relative to the aircraft, the exhaust flaps 30 may be regulated by subjecting one side of the diaphragm 40 to the impact pressure measured in this surrounding air instead of measured in the air entering intake duct 12. Figure 2 partially illustrates such a modification. The modification of Figure 2 is similar to Figure 1 except a Pitot tube 48' has been substituted for the tube 48 of Figure 1, the Pitot tube 48' extending out into the surrounding undisturbed air stream about the aircraft. The arrangement of Figure 1 has the advantage in that the tube 48 does not project into the airstream about the aircraft and is self contained within the power plant. Even if the turbine power plant does not have a forwardly directed air intake opening, the flap control of Figure 2 may be used for maximum thrust efficiency.

At this point it should be noted that, although the invention has been described in connection with the gas turbine type power plant, the invention obviously also is applicable to other internal combustion engines, for example a conventional reciprocating internal combustion engine.

As previously noted, in general if the impact pressure of the exhaust gases is maintained equal to the impact pressure of the undisturbed surrounding air relative to the aircraft, the resulting exhaust velocity is slightly larger than the value for maximum thrust efficiency. However, this result depends on the efficiencies of the compressor and turbine and on the velocity coefficient of the exhaust nozzle. For this reason and because the propeller hub may add slightly to the pressure of the air entering the intake duct it may be desirable to maintain the ratio of these impact pressures something other than unity, for example as illustrated in Figure 3, in order to maintain a desired thrust efficiency. In this modification a housing 70 is divided into a pair of end chambers 72 and 74 and an intermediate chamber 76 by a pair of diaphragms 78 and 80 of unequal area. The intermediate chamber 76 is vented to the static pressure of the surrounding atmosphere through passage 82 while end chambers 72 and 74 are subjected to the impact pressure of the entering air and exhaust gases respectively through conduits 84 and 86. Instead of measuring the impact pressure of the entering air in the intake duct 12, the conduit 84 may, as illustrated, extend out into the surrounding air-stream in the form of a Pitot tube similar to tube 48' in Figure 2. The diaphragms 78 and 80 are connected together for joint movement by a stud 88. A pair of switch contacts 90 and 92 are arranged in a manner similar to the switch contacts in Figures 1 and 2, such that upon deflection of the diaphragm assembly to the left, contact 90 is engaged to complete a circuit to the flap motors to effect an opening adjustment of the flaps. Similarly, upon movement of the diaphragm assembly to the right, contact 92 is engaged to complete a circuit to the flap motors to effect a closing adjustment of the flaps.

With the structure of Figure 3 so far described and because the diaphragms 78 and 80 are of unequal area, the exhaust flaps will be automatically adjusted to maintain an exhaust gas impact pressure which is less than and proportional to the entering air impact pressure. During engine operation with the aircraft parked on the ground and with the propeller having little or no effect on the intake air pressure in duct 12, the impact pressure within the intake duct 12 is substantially equal to atmospheric pressure and therefore the impact pressure of the exhaust gases necessarily is larger and the diaphragms 78, 80 will deflect to the left to fully open the exhaust flaps 30. Similarly, in Figure 1 when the engine is operated with the aircraft on the ground, the impact pressure of the exhaust gases will be effective to urge diaphragm 40 to the left to fully open the exhaust flaps. However, it is desirable that the discharge velocity of the exhaust gases be maintained above a predetermined value. This result may be accomplished by disposing a spring so as to urge the control diaphragm against the force produced by the impact pressure of the exhaust gases thereon. Such a spring is illustrated at 94 in Figure 3. Accordingly the spring 94 is designed to exert a force such that, while the aircraft is on the ground, the magnitude of the impact pressure of the exhaust gases against diaphragm 80 required to balance this spring force will result in the desired minimum exhaust gas discharge velocity. Obviously a similar spring may be provided in the embodiments of Figures 1 and 2, for example as illustrated in Figure 4. Figure 4 is identical with Figures 1 and 2 except for the addition of the spring 94 so that no further description of Figure 4 appears necessary. The addition of the spring 94 to Figure 3, as shown in Figure 4, also makes it possible to maintain the impact pressure of the intake air substantially equal to the impact pressure of the exhaust gases through at least a limited operating range in addition to the provision of a predetermined minimum exhaust discharge velocity. To this end, the diaphragm 78 is made sufficiently smaller than the diaphragm 80 so that during a limited operating range, the spring force is approximately equal to the force exerted by the exhaust gas impact pressure on that much of the area of diaphragm 80 in excess of the area of diaphragm 78, and therefore, at least in said limited range, the impact pressure of the exhaust gases will be maintained substantially equal to the impact pressure of the entering air.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A vehicle gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; an adjustable discharge nozzle for said exhaust duct; means providing a first force which is substantially proportional to the impact pressure of the surrounding air relative to said power plant; means providing a second force which is substantially proportional to the impact pressure of the exhaust gases discharging through said duct; means responsive to changes in said forces; and means controlled by said responsive means for adjusting said nozzle so that an increase in said first-mentioned impact pressure and a decrease in said second-mentioned impact pressure both tend to effect a closing adjustment of said nozzle.

2. A vehicle gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; an adjustable discharge nozzle for said exhaust duct; means providing a first force which is substantially proportional to the impact pressure of the surrounding air relative to said power plant; means providing a second force which is substantially proportional to the impact pressure of the exhaust gases discharging through said duct; means responsive to changes in said forces; and means controlled by said responsive means for adjusting said nozzle so as to maintain said impact pressures substantially equal.

3. A vehicle gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; an adjustable discharge nozzle for said exhaust duct; means responsive to changes in the air velocity of the vehicle and to changes in the discharge velocity of the exhaust gases; and means controlled by said responsive means for adjusting said nozzle so that a decrease in said air velocity and an increase in said discharge velocity both tend to effect an opening adjustment of said nozzle.

4. A vehicle gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; an adjustable discharge nozzle for said exhaust duct; a housing having a pair of chambers; means for subjecting one of said chambers to a fluid pressure substantially proportional to the impact pressure of the surrounding air relative to said power plant; means for subjecting the other of said chambers to a fluid pressure substantially proportional to the impact pressure of the exhaust gases discharging through said exhaust duct; movable means separating said chambers and movable in response to changes in said fluid pressures; and means automatically controlled only by said movable means for adjusting said nozzle so as to maintain said impact pressures substantially equal.

5. A vehicle gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; an adjustable discharge nozzle for said exhaust duct; a housing having a pair of chambers; means for subjecting one of said chambers to a fluid pressure substantially proportional to the impact pressure of the surrounding air relative to said power plant; means for subjecting the other of said chambers to a fluid pressure substantially proportional to the impact pressure of the exhaust gases discharging through said exhaust duct; movable means separating said chambers and movable in response to changes in said fluid pressures; and means automatically controlled only by said movable means for adjusting said nozzle so that an increase in said first-mentioned fluid pressure and a decrease in said second-mentioned fluid pressure both tend to effect a closing adjustment of said nozzle.

6. An aircraft gas turbine power plant having a combustion chamber, a turbine arranged to be driven by combustion gases from said chamber, a compressor drivably connected to said turbine for supplying said chamber with compressed air, a bladed aircraft propeller also drivably connected to said turbine, a forwardly directed air intake duct for said compressor, a rearwardly directed exhaust duct through which the turbine exhaust gases continuously discharge during turbine operation, and an adjustable discharge nozzle for said exhaust duct; means providing a first fluid pressure which is substantially proportional to the impact pressure of the surrounding air relative to the power plant; means providing a second fluid pressure which is substantially proportional to the impact pressure of the exhaust gases discharging through said duct; means responsive to changes in said fluid pressures; and means controlled by said responsive means for adjusting said nozzle so as to maintain said impact pressures substantially equal.

7. An aircraft gas turbine power plant having a combustion chamber, a turbine arranged to be driven by combustion gases from said chamber, a compressor drivably connected to said turbine for supplying said chamber with compressed air, a bladed aircraft propeller also drivably connected to said turbine, a forwardly directed air intake duct for said compressor, a rearwardly directed exhaust duct through which the turbine exhaust gases continuously discharge during turbine operation, and an adjustable discharge nozzle for said exhaust duct; means providing a first fluid pressure which is substantially proportional to the impact pressure of the surrounding air relative to the power plant; means providing a second fluid pressure which is substantially proportional to the impact pressure of the exhaust gases discharging through said duct; means responsive to changes in said fluid pressures; and means controlled by said responsive means for adjusting said nozzle so that an increase in said first-mentioned fluid pressure and a decrease in said second-mentioned fluid pressure both tend to effect a closing adjustment of said nozzle.

8. An aircraft gas turbine power plant having a combustion chamber, a turbine arranged to be driven by combustion gases from said chamber, a compressor drivably connected to said turbine for supplying said chamber with compressed air, a bladed aircraft propeller also drivably connected to said turbine, a forwardly directed air intake duct for said compressor, a rearwardly directed exhaust duct through which the turbine exhaust gases continuously discharge during turbine operation, and an adjustable discharge nozzle for said exhaust duct; means communicating with said intake duct and providing a fluid pressure substantially proportional to the impact pressure of the air flowing through said duct; means communicating with said exhaust duct and providing a fluid pressure substantially proportional to the impact pressure of the exhaust gases discharging therethrough; means responsive to changes in said fluid pressures; and means controlled by said responsive means for adjusting said nozzle so that an increase in said first-mentioned fluid pressure and a decrease in said second-mentioned fluid pressure both tend to effect a closing adjustment of said nozzle.

9. In combination with a vehicle; a gas turbine power plant having a combustion chamber; a turbine arranged to be driven by combustion gases from said chamber; a compressor drivably connected to said turbine for supplying said chamber with compressed air; vehicle propelling means also drivably connected to said turbine; a forwardly directed air intake duct for said compressor; a rearwardly directed exhaust duct through which the turbine exhaust gases continuously discharge during turbine operation; means adjustable to vary the discharge velocity of the exhaust gases; means responsive to changes in the air velocity of the vehicle and to changes in the discharge velocity of the exhaust gases; and means controlled by said responsive means for effecting operation of said adjustable means so that a decrease in said air velocity and an increase in said discharge velocity both tend to effect operation of said adjustable means in a direction to decrease said discharge velocity.

W. G. LUNDQUIST.
KENNETH A. BROWNE.

REFERENCES CITED

The following references are of record in the file of this patent:

UNITED STATES PATENTS

| Number | Name | Date |
| --- | --- | --- |
| 2,280,835 | Lysholm | Apr. 28, 1942 |
| 2,326,072 | Seippel | Aug. 3, 1943 |
| 2,342,262 | Franz et al. | Feb. 22, 1944 |
| 2,411,895 | Poole | Dec. 3, 1946 |